March 8, 1932.  A. N. EMMONS  1,848,330
ADJUSTABLE PORTABLE POWER HANDSAW
Filed July 29, 1930   3 Sheets-Sheet 1
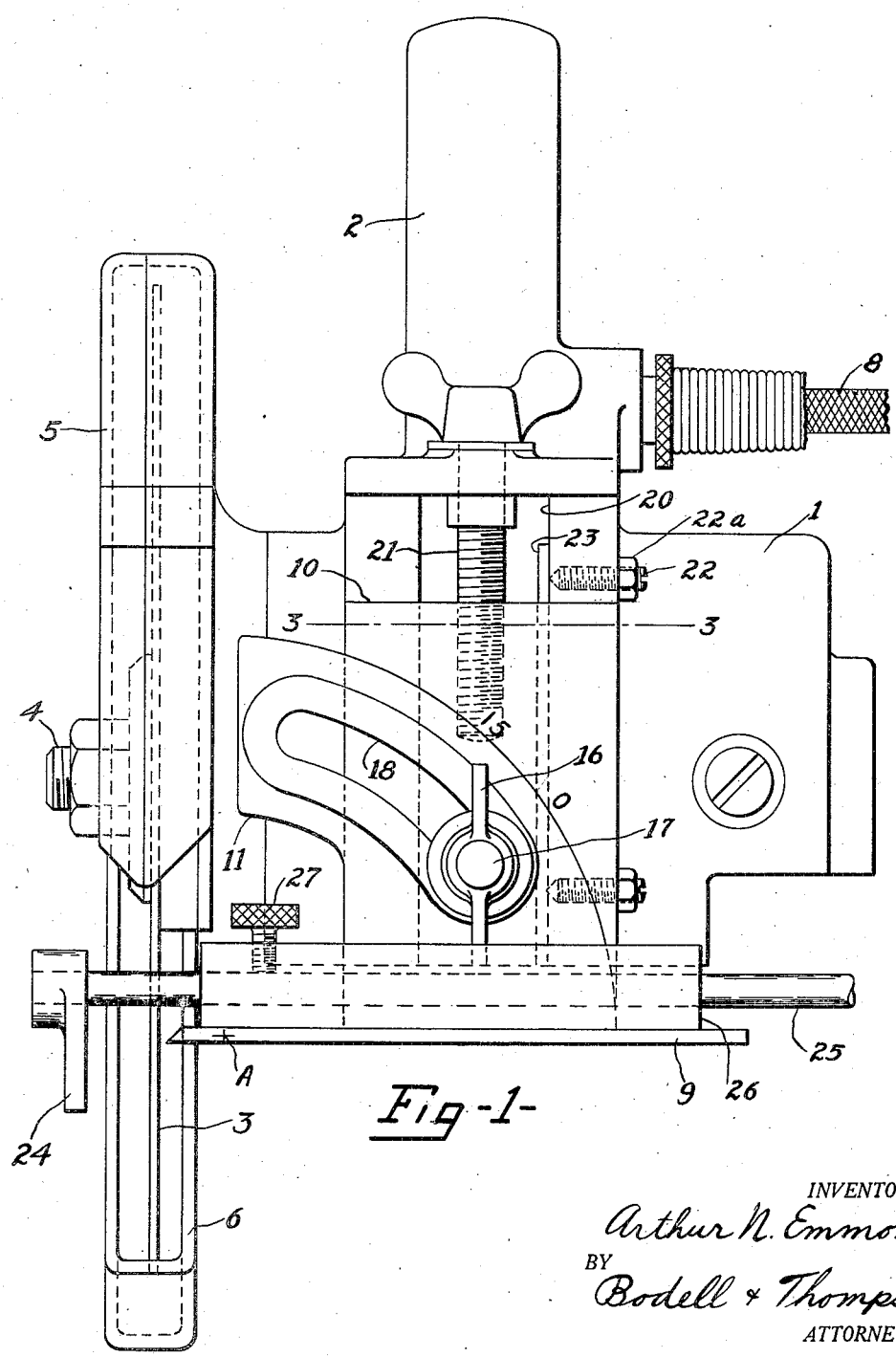
Fig-1-
INVENTOR.
Arthur N. Emmons
BY
Bodell & Thompson
ATTORNEYS.

March 8, 1932.  A. N. EMMONS  1,848,330
ADJUSTABLE PORTABLE POWER HANDSAW
Filed July 29, 1930   3 Sheets-Sheet 2
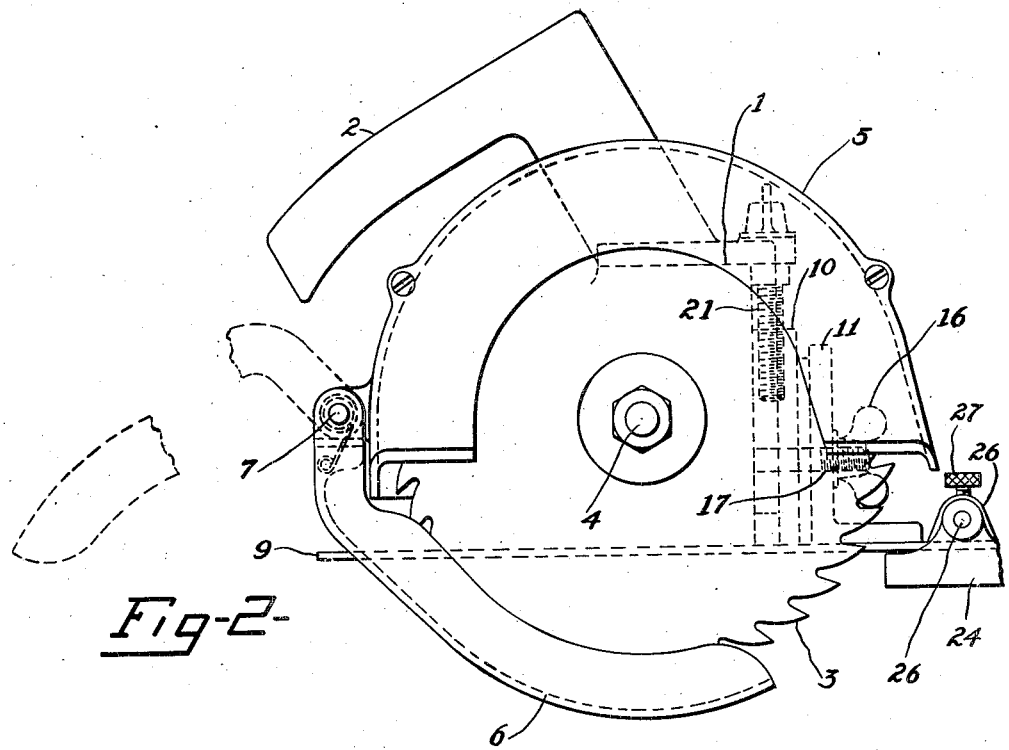
Fig-2-
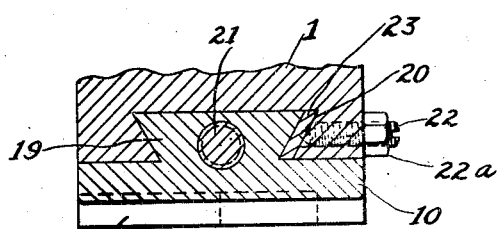
Fig-3-
INVENTOR.
Arthur N. Emmons
BY
Bodell + Thompson
ATTORNEYS.

March 8, 1932.  A. N. EMMONS  1,848,330
ADJUSTABLE PORTABLE POWER HANDSAW
Filed July 29, 1930  3 Sheets-Sheet 3
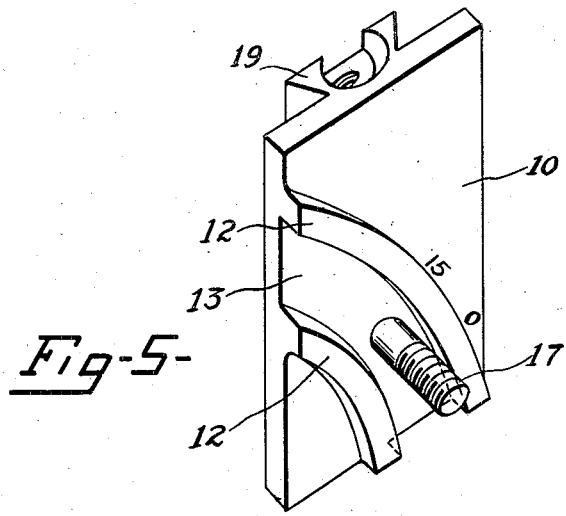
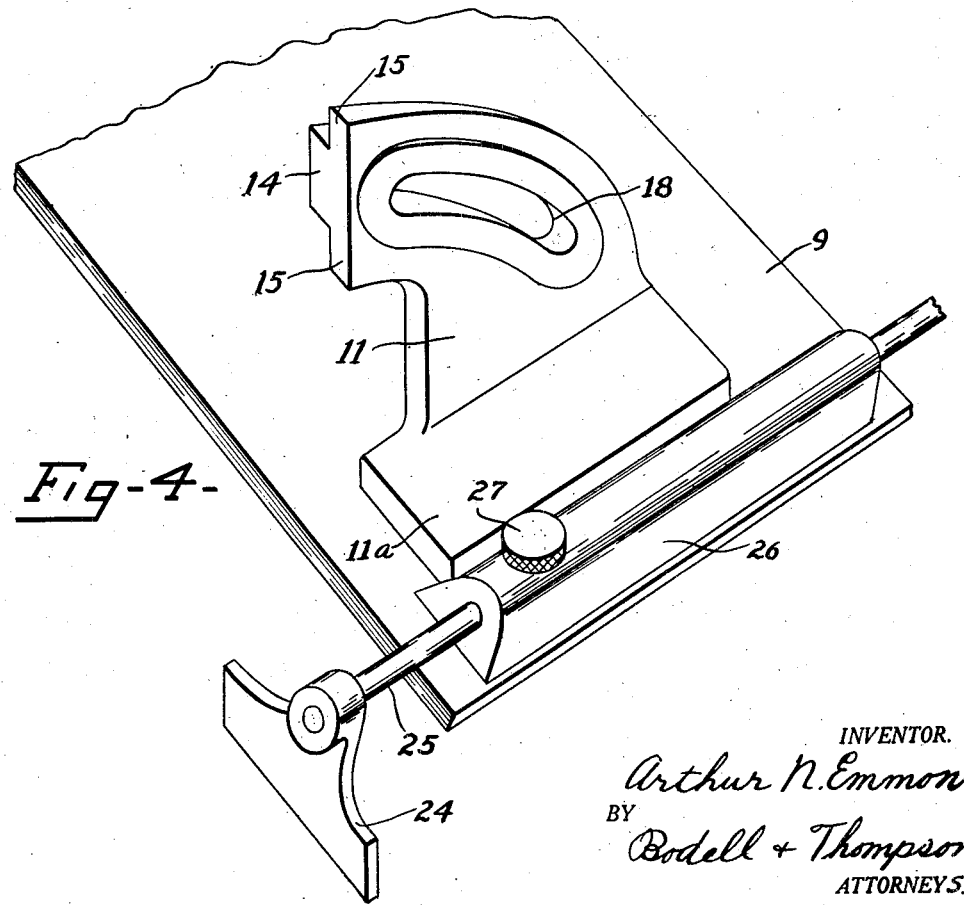
INVENTOR.
Arthur N. Emmons
BY
Bodell + Thompson
ATTORNEYS.

Patented Mar. 8, 1932

1,848,330

UNITED STATES PATENT OFFICE

ARTHUR N. EMMONS, OF SYRACUSE, NEW YORK, ASSIGNOR TO THE PORTER-CABLE MACHINE COMPANY INC., OF SYRACUSE, NEW YORK, A CORPORATION OF NEW YORK

ADJUSTABLE PORTABLE POWER HANDSAW

Application filed July 29, 1930. Serial No. 471,498.

This invention relates to power hand saws and has for its object a particularly simple and efficient means for varying the angle of the rotary saw blade and also particularly simple and efficient means for varying the depth of the cut.

The invention consists in the novel features and in the combinations and constructions hereinafter set forth and claimed.
In describing this invention, reference is had to the accompanying drawings in which like characters designate corresponding parts in all the views.

Figure 1 is a front elevation of a power hand saw embodying my invention.

Figure 2 is a side elevation thereof.

Figure 3 is a sectional view on line 3—3, Figure 1.

Figure 4 is a fragmentary isometric view of the base plate.

Figure 5 is an isometric view of the bearing part associated with the saw body.

1 designates a saw body having a suitable handle 2, the body enclosing an electric motor not shown, the rotor or shaft of which is journalled in the body.

3 designates the rotary saw blade mounted on the shaft or arbor 4 which is actuated by and usually an extension of the motor shaft.
5 is a guard for the upper portion of the saw blade and 6 is a movable guard for the lower edge of the saw blade, this being pivoted at 7 to the body and movable into dotted line position, Figure 2, by the work, when the saw is being fed along the work. The current is supplied to the motor within the housing 1 through a suitable cable 8 and is controlled by a switch handle not shown associated with the handle 2. The features thus far described form no part of this invention.

9 designates a base plate on which the body is mounted. The body is adjustable about an axis relative to the base plate to vary the angle of the saw so that it cuts various bevels.
In the illustrated embodiment of my invention, the saw body is provided with a bearing or supporting part and the base plate is provided with a bearing or supporting part, these two parts being provided with coacting arcuate guide means having a common center located below the axis of the saw blade 3 and near the same, this axis being usually located about midway between the axis of the saw and the lowermost part of the saw.

10 is the bearing part mounted on the saw body 1 on the front end thereof and 11 is the bearing part extending upwardly from the base plate 9, this being a bracket having a base flange 11ª secured to the base plate 9. The part 10 is provided with concentric arcuate ribs or ways 12 forming an arcuate channel 13 between them and the bracket 11 is provided with an arcuate guide rib 14 fitting the channel 13 and with flanges 15 lapping the front faces of the ribs 12. The two bearing parts 10, 11 are connected together by means of a nut 16 threading on a stud 17 projecting from the bearing part 10 and located in the channel 13 and extending through an arcuate slot 18 formed in the bearing part 11 and opening through the rear face of the rib 14. The axis of the interfitting guide means of the bearing parts 10 and 11 is located approximately at A, Figure 1. The bearing parts extend in general planes at a right angle to the saw blade.

In order that the depth of the cut may be varied, the bearing part 10 is adjustably mounted on the saw body 1 to have a rectilinear movement toward and from the base, and as here illustrated, the bearing part and the body are formed with coacting ways 19 and 20 and the part 10 is adjustable vertically by means of the screw 21 extending lengthwise of the ways and held from endwise movement relatively to the body 1 and threading into the bearing part 10. In that the ways 19 on the part 10 may properly fit the ways 20 on the body 1, a gib 23 is provided in one of the ways 19. This gib is adjustable by means of the screws 22 and lock nuts 22ª. This gib also provides take up for wear.

To vary the depth of the cut it is only necessary to turn the screw 21 by means of the wing nut on the top thereof. To adjust the angle of the cut, the nut 16 is loosened and the saw body moved along the bearing part 11 about the axis A to the desired position and the nut 16 again tightened.

A gage 24 for rip work is provided on the base plate, this being carried by a rod 25 extending through a transverse tubular guide 26 at the front end of the base plate and being held in any adjustable position by a set screw 27.

In rip work, the gage is set so as to engage the edge of the board being ripped.

This invention is particularly advantageous in that it provides a simple means by which the saw blade can be readily and accurately adjusted to cut different angles and to cut different depths.

What I claim is:

1. In a portable power driven saw of the type manipulated and guided in its entirety by the operator, the combination of a motor housing having a saw arbor journalled therein and a motor for actuating the arbor, a saw blade carried on one end of the arbor, a base plate for resting on the surface of the work and having one edge extending adjacent the saw blade, a single supporting means secured to the base plate and the motor housing for supporting the latter including a supporting member secured to one end of the base plate, a second supporting member carried by the motor housing and being adjustable vertically toward and from the base plate, said members having complemental arcuate guide portions arranged with the axis of the arc located near the edge of the base plate adjacent the saw, whereby the base plate is adjustable relative to the motor housing about said axis.

2. In a power driven portable saw of the type manipulated and guided in its entirety by the operator, the combination of a motor housing having a rotor shaft journalled therein and a saw blade secured on one end of said shaft, a base plate slidable over the surface of the work and extending on one side of the saw blade only, a single supporting means between the base plate and the motor housing including a supporting member carried by the motor housing and being adjustable vertically toward and from the base plate, a second supporting member secured at one end of the base plate, said members being adjustable relatively along complemental arcuate guide portions, and means for securing the members in any adjusted position.

3. In a power driven portable saw of the type manipulated and guided in its entirety by the operator, the combination of a motor housing, a saw arbor journalled in said housing and having a saw blade secured on its outer end, a motor for actuating said arbor, a base plate for resting on the surface of the work and slidable with the saw, a supporting member secured at one end of the base plate in alignment with the intersection of the saw blade with the work, a supporting member carried by the motor housing, the supporting members having complemental arcuate guide portions for adjustment of the base plate relative to the axis of the saw arbor, the supporting member carried by the motor housing having means for vertically adjusting the supporting members and the base plate toward and from the motor housing in a direction parallel with the saw blade.

4. In a portable power saw of the type manipulated and guided in its entirety by the operator, the combination of a motor housing, a saw arbor journalled in said housing and having a saw blade secured to its outer end, a motor in said housing for actuating the arbor, a base plate extending parallel to the saw blade and to one side thereof for supporting the motor housing, a supporting member secured to the base plate near one end thereof, a second supporting member adjustably secured to the motor housing and being adjustable toward and from the base plate, the supporting members having means for adjustment of the base plate relative to the motor housing about an axis adjacent the edge of the base plate toward the saw.

5. In a portable power hand saw of the type manipulated and guided solely by the hands of the operator, the combination of a motor housing having a motor therein, a saw arbor actuated by the motor and a saw blade carried by one end of the arbor, a base plate slidable on the surface of the work, supporting members secured to the motor housing and to the base plate respectively, said members constituting a single support for the motor housing, the supporting member secured to the base plate being secured in alignment with the intersection of the saw blade with the work.

In testimony whereof, I have hereunto signed my name at Syracuse, in the county of Onondaga, and State of New York, this 25 day of July, 1930.

ARTHUR N. EMMONS.